United States Patent [19]
Connolly

[11] 3,935,806
[45] Feb. 3, 1976

[54] SMOKELESS BARBECUE UNIT

[75] Inventor: Timothy J. Connolly, Vallejo, Calif.

[73] Assignee: The Raymond Lee Organization, Inc., New York, N.Y.; a part interest

[22] Filed: Mar. 21, 1974

[21] Appl. No.: 453,267

[52] U.S. Cl. .................. 99/340; 99/421 H; 99/446
[51] Int. Cl.² ........................................ A47J 37/07
[58] Field of Search ............ 99/421, 339, 340, 419, 99/420, 444, 445, 446; 126/2–3, 8, 25, 29–30, 41

[56] References Cited
UNITED STATES PATENTS

| | | | |
|---|---|---|---|
| 492,970 | 3/1893 | Ramage | 99/445 UX |
| 1,701,033 | 2/1929 | Elbert | 99/421 H X |
| 2,472,164 | 6/1949 | Mannheimer | 126/25 |
| 2,512,223 | 6/1950 | Contiguglia | 99/421 HH X |
| 2,520,067 | 8/1950 | Sagen | 99/420 |
| 3,045,581 | 7/1962 | Bernstein | 99/340 |
| 3,079,909 | 3/1963 | Bemben | 99/421 H X |
| 3,369,481 | 2/1968 | Pappas | 99/445 |
| 3,604,338 | 9/1971 | Fiedler | 99/339 |
| 3,667,376 | 6/1972 | Thompson | 99/446 X |

Primary Examiner—Harvey C. Hornsby
Assistant Examiner—Arthur O. Henderson
Attorney, Agent, or Firm—Howard I. Podell

[57] ABSTRACT

A smokeless barbecue unit for uniformly broiling of food in which the fire box is mounted in each of the three walls of the chamber surrounding the grilling section. The device may incorporate a rotating spit or alternately the food may be placed on a grill which is of an inverted V-shape construction.

2 Claims, 3 Drawing Figures

SMOKELESS BARBECUE UNIT

SUMMARY OF THE INVENTION

My invention relates to an improved smokeless barbecue device, and particularly one in which the fire box is mounted in the three walls of the chamber surrounding the cooking section and grill.

BRIEF DESCRIPTION OF THE DRAWING:

The objects and features of the invention may be understood with reference to the following detailed description of the illustrative embodiment of the invention, taken together with the accompanying drawings in which.

Figure 1:
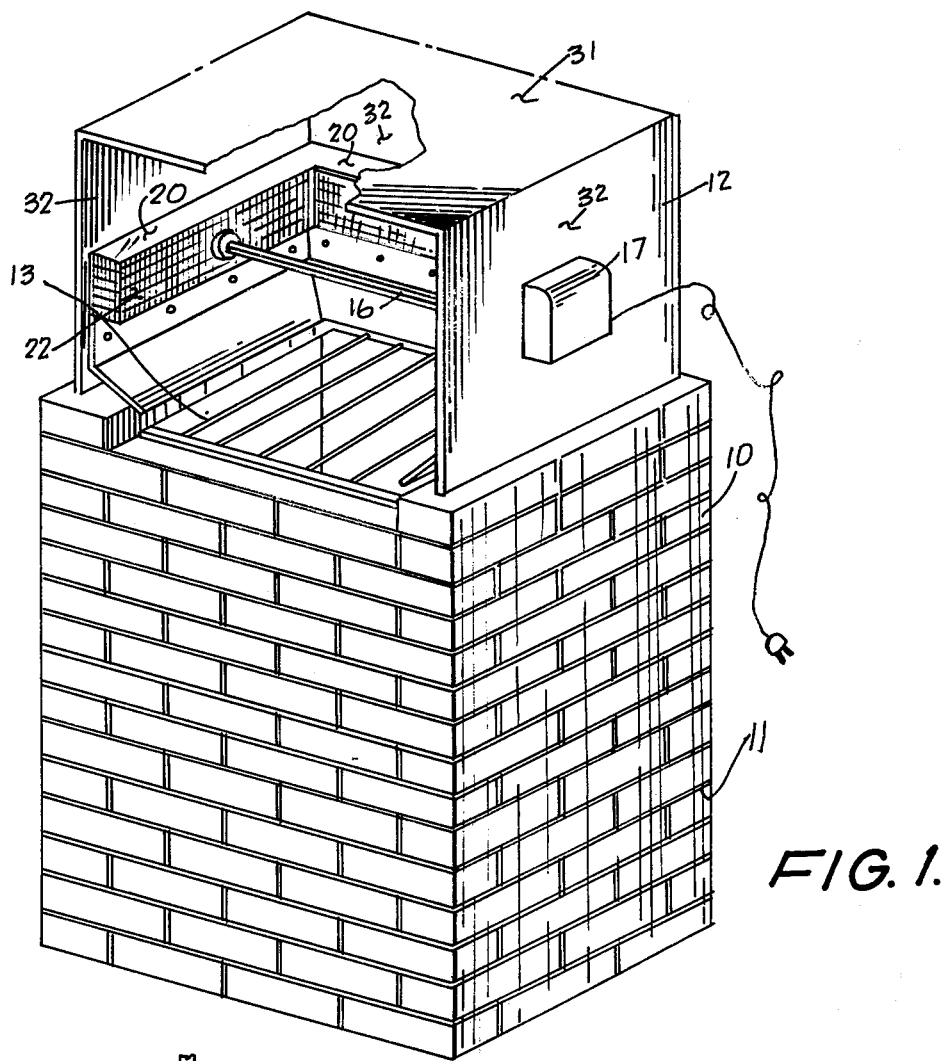
FIG. 1 illustrates a perspective view of the invention.
Figure 2:
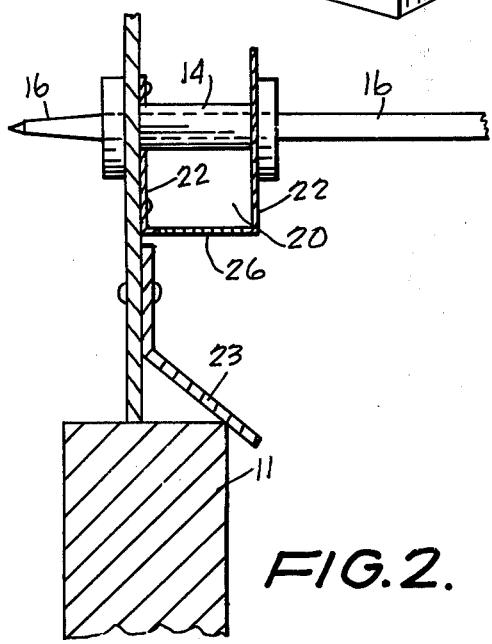
FIG. 2 illustrates a partial sectional view of the invention in elevation.

DESCRIPTION OF THE PREFERRED EMBODIMENT:

Turning now descriptively to the drawings, in which similar reference characters denote similar elements throughout the several views, FIGS. 1–2 show the smokeless barbecue device 10 which is designed so that neither ashes nor smoke accumulates during the barbecuing of food. The smokeless barbecue device 10 comprises a rectangular box housing 12 mounted on a brick chimney 11. Housing 12 is fitted with an integral top cover 31, an open front face, and open bottom base and three sides 32. A grill 13 rests on top of the chimney base 11.

A fire box 20, open to the top, is mounted on the interior of each of the three sides 32 in which charcoal may be placed, with the bottom of the firebox 20 formed of a screen mesh 26 and the sides 22 of the firebox 20 formed of sheet metal. An ash guard 23 in the form of a sloping metal tray is located under the mesh bottom 26 of the firebox 20 to divert any ashes which fall from the firebox into the interior of the chimney base 11.

A rotatable spit rod 16 is operated by a motor 17 mounted externally on one of the sides 32 of the barbecue unit 10. The spit rod 16 is supported by a hollow horizontal through tube 14 mounted in the side 32 of the barbecue opposed to the motor mount side, with tube 14 passing through the firebox chamber. A similar tube 14 is mounted in the firebox chamber. A similar tube 14 is mounted in the firebox chamber 20 adjacent the motor 17, as shown in FIG. 3.

Figure 3:
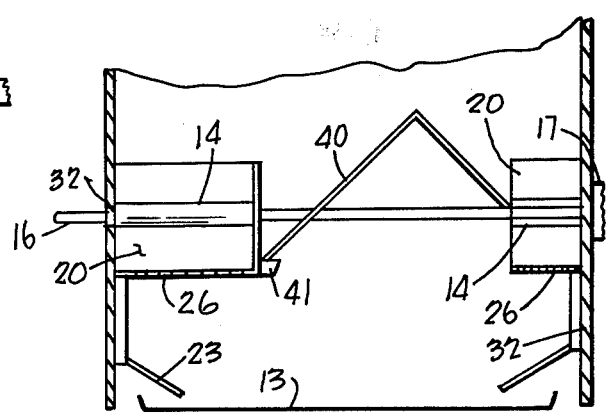
FIG. 3 illustrates a sectional view of an alternate view of the invention.

As shown in FIG. 3, a grill 40 may be mounted to external projections 41 of the walls 22 of the firebox 20, with grill 40 being formed as an inverted V-shape so that food placed on grill 40 lies on a plane that is at an angle to the vertical sides 22 of the firebox 20 and to the horizontal plane of the conventional grill 13 that rests on the base chimney 11. Grill 40 supports food being barbecued so as to present a uniform source of heat from firebox 20 to food resting on V-shape grill 40.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A barbecue unit for broiling food comprising
   a hollow chimney base section, with a first grill mounted over the top of the recess of the chimney base,
   a housing mounted on the top of the sides of the base section, above the said first grill, formed of three sides and a top section,
   a firebox mounted on the interior of each of the three sides of the housing, the firebox being open on its top face and fitted with a screen mesh bottom, together with an inclined tray member mounted to each inner side wall of the housing below the firebox, said tray member extending from a side wall to terminate over the recess of the hollow recess of the chimney base section, so as to carry ashes from the firebox into the chimney recess, together with
   a food-supporting second grill which is of an inverted V-shape, formed of two flat grill segments that are each inclined to the plane of the other, and join at the apex of the said second grill so that a strip of food may hang from the apex of the said second grill and rest on each of the said second grill segments.

2. The combination as recited in claim 1 in which the first grill is formed of wire rod members.

* * * * *